Oct. 22, 1963  O. KAUP ETAL  3,107,491
IMPROVED HYDRAULIC TRANSMISSION OF ENERGY
Filed Aug. 16, 1960

INVENTORS:
Otmar Kaup
Franz Forster
BY:
Pierce, Scheffler & Parker
ATTORNEYS.

United States Patent Office
3,107,491
Patented Oct. 22, 1963

3,107,491
IMPROVED HYDRAULIC TRANSMISSION
OF ENERGY
Otmar Kaup, Aschaffenburg, and Franz Forster, Glattbach, near Aschaffenburg, Germany, assignors to Gesellschaft für Linde's Eismaschinen Aktiengesellschaft, Hollriegelskreuth, near Munich, Germany, a company of Germany
Filed Aug. 16, 1960, Ser. No. 49,898
Claims priority, application Germany Oct. 6, 1959
4 Claims. (Cl. 60—53)

This invention relates generally to a hydraulic energy converter, and more particularly to a hydraulic energy converter having first means for converting mechanical energy to hydraulic energy and second means for converting the hydraulic energy to mechanical energy, said first and said second energy converting means being mounted within a unitary casing containing hydraulic fluid and serving as a reserve tank therefor.

Hydraulic energy converters utilizing mechanical-to-hydraulic and hydraulic-to-mechanical energy converters are, of course, well known in the prior art. By suitable control of the mechanical-to-hydraulic energy converting means (i.e., the "pump") and/or by control of the hydraulic-to-mechanical energy converting means (i.e., the "motor"), transfer of energy may be achieved which is less complicated, requires less space, and provides a greater range of speed regulation than the purely mechanical energy converters.

The primary object of the present invention is to provide an improved hydraulic energy converter for power transmission use in land and water vehicles, farm machinery, construction and industrial apparatus, and the like. The invention is characterized by mounting the mechanical-to-hydraulic and the hydraulic-to-mechanical energy converters in a single reservoir-casing which contains the hydraulic fluid and which acts as a reserve tank therefor. The valve block, oil filter, and hydrostatic control means are similarly mounted on or within the casing whereby fluid transmission lines are eliminated, the losses of hydraulic fluid transmisison energy are reduced, and the efficiency of the converter is increased. As a result of the greater range of regulation of the improved hydraulic energy converter, particularly when used in connection with an internal combustion engine drive means, the capacity of the drive means can be utilized to its highest extent so that a powerful and economical operation is achieved, particularly when used in applications where frequent changes of the driven resistance and driven direction occur. In order that the hydraulic energy converter might be used in many diverse applications, one or more speed-changing gearing stages may be mounted upon the casing for stepping up or down the rotational speed of the energy converter output shaft. Thus the mass-produced hydraulic energy converter may be readily adapted for use with internal combustion engines ranging from the sturdy one- or two-cycle slow-operating diesel engines to the highly specialized very light Otto-motor high-speed engines. In order to dissipate the heat which is developed by the hydraulic energy conversion, the hydraulic fluid in the casing may be cooled in several ways, as for example, by evaporative cooling of the unitary reservoir-casing, by the provision of cooling pipes directed through the interior of the reservoir-casing, by fin means, or by means of air currents produced by ventilation or fan means connected to the input shaft of the energy converter. Furthermore, the coolant, heated by heat transfer from the hydraulic fluid, may be advantageously used further for heating purposes.

According to the concept of the present invention the mechanical-hydraulic, and the hydraulic-mechanical energy converters are of the hydrostatic thrust piston type, and are disposed in a common housing, and the two energy converters are non-coaxially arranged with respect to each other.

Another object of the invention resides in the provision of means for automatically controlling the operation of the hydraulic converter in accordance with the loading on the output shaft thereof as well as in accordance with the power supplied to the input shaft thereof, in order that the converter will operate at maximum efficiency wtihout reducing the rotational speed (and power capacity) of the driving engine means. Simultaneously, the control device may be automatically operable to operate the drive engine at operating conditions of the lowest consumption of fuel, when the machine's highest output is not required.

Other objects and advantages of the present invention will become more apparent from a study of the following specification when considered in conjunction with the accompanying drawings in which.

Figure 1:
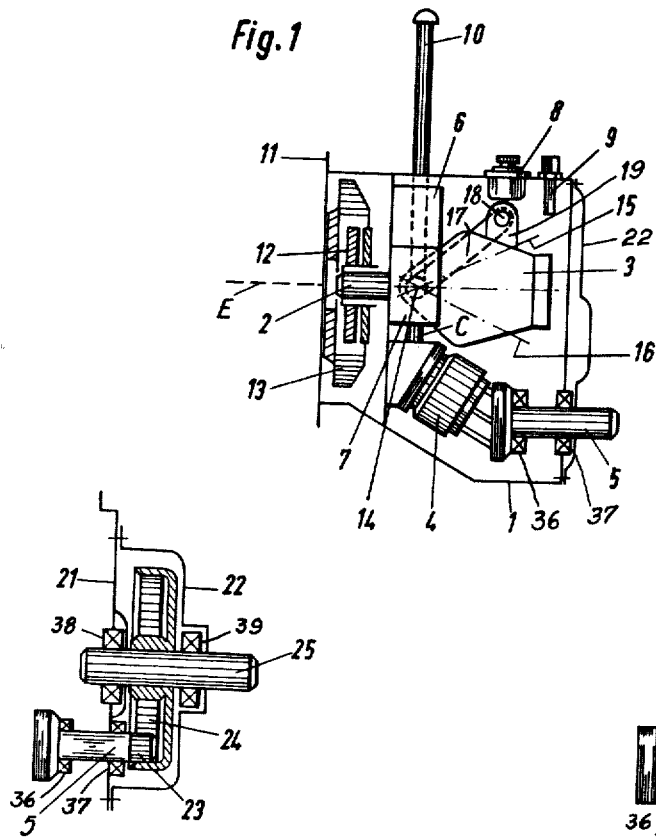
FIG. 1 is a diagrammatic sectional view of the hydraulic energy converter.

Referring first more particularly to FIG. 1 of the drawings, the hydraulic energy converter—which is particularly suitable for use as the transmission means in a maritime vessel, for example—has a unitary reservoir-casing 1 provided at one end with a flange 11 by means of which the reservoir-casing is secured to the crank case of an internal combustion engine, not shown. The converter includes an input or driving shaft 2 which rotatably drives the variable-capacity control pump 3 whereby the rotational mechanical input energy is converted into hydraulic energy. The pump 3 supplies hydraulic fluid to the hydraulic motor 4 through condit C, which motor is driven by the fluid to convert the hydraulic energy into mechanical energy to drive the output or driven shaft 5 or 25, or 35, journalled in fixed bearings 36—39 in the reservoir-casing. The casing 1, which constitutes a receptacle for the hydraulic fluid, is provided with an oil filter 8 and an air filter 9.

The major portion of motor 4 and the variable capacity pump 3 are both preferably supported by the supporting block 7, as well as the valve block 6 which includes known hydrostatic switching or control means.

The position of control pump 3—which is pivotally connected to supporting block 7 by means of horizontal shaft 14—may be adjusted by means of lever 10 to progressively vary the capacity of the pump in either direction from zero to the full capacity positions 15 and 16 shown by the broken lines for forward and reverse drive, respectively. Of course, the control pump 3 may be mounted in said casing 1 for pivotal movement about a vertical axis, whereby counter-balancing against the weight of the pump is not required.

The operation of the hydraulic energy converter may now be briefly described.

Rotational mechanical energy from the output shaft E of the internal combustion engine is transmitted to input shaft 2 through the elastic coupling means 12. The means for driving the input shaft 2 may include, in a known manner, conventional cooling or ventilating means shown schematically by the reference numeral 13 in FIG. 1 for blowing cooling air across the reservoir-casing 1, or for driving other types of known cooling means to cool either the reservoir-casing 1 or the hydraulic fluid contained therein.

Rotation of shaft 2 will drive variable-capacity pump 3 to force hydraulic fluid—at a rate and direction selected by the position of lever 10—contained in the housing 1 through conduit C to rotatably drive the hydraulic motor 4 and output shaft 5. Depending on the position of lever 10 (and the resulting pivotal position of variable-capacity control pump 3 in housing 1), the output shaft 5 will be driven either in the forward or in the reverse direction.

As is apparent in FIG. 1, the driven or output shaft 5 advantageously lies at an elevation lower than that of the drive shaft 2 so that when the converter apparatus is used in marine applications, the propeller shaft does not have to be directed downwardly at an oblique angle as is the case in some known ship transmission means. While the axis of the driven shaft 5 has been illustrated as being parallel to the drive shaft 2, it could readily be arranged at an angle thereto merely by substituting only simple constructional elements, such as the shape and position of supporting block 7 and of the various means within the reservoir casing 1.

Figures 2, 3:
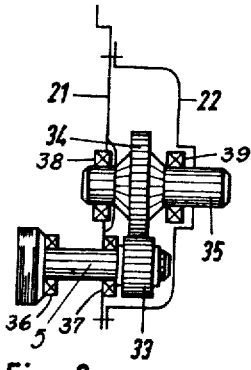
FIGS. 2 and 3 illustrate speed-changing gear means for reducing or increasing the converter output shaft rotational speed.

Referring now to FIG. 2, the output shaft speed of the hydraulic energy converter may be stepped down (or up) as desired by pinion and follower gearing means secured to the rear portion 21 of the reservoir-casing 1. Pinion 23 on driven shaft 5 is in meshing engagement with ring follower gear 24 on the driven shaft 25, which shaft 25 is journalled in fixed bearing means within the cover 22, whereby the roational speed of driven shaft 5 is stepped down and transmitted to ultimate output shaft 25 as desired. Similarly, in FIG. 3, pinion gear means 33, 34 may be provided for stepping down the rotational speed of driven shaft 5 transmitted to the ultimate output shaft 35.

Figure 4:
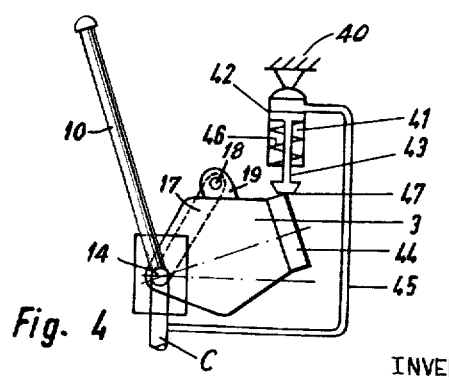
FIG. 4 is a diagrammatic illustration of fluid-pressure responsive means for automatically adjusting the capacity of the control pump to fully utilize the capacity of the internal combustion engine.

FIG. 4 discloses a discharge-pressure-controlled delivery volumeter for controlling the operation of pump 3 to utilize the full capacity of the internal combustion engine. Fluid in the conduit C is conducted through conduit 45 to the chamber above piston 42 in the cylinder 41 to move the piston downwardly against the biasing force of spring 46. The lower part 47 of piston 42 projects from the cylinder 41 and constitutes a projection or stop for limiting the extent of pivotal movement of the variable-capacity pump 3. When the pressure in conduit C increases, due to an increase in speed of the internal combustion engine shaft E or to a reduction in loading on the ship's propeller, piston 42 and limiting projection or stop 47 will be moved downwardly to automatically limit (i.e., reduce) the capacity of the pump 3, and when the pressure in conduit C decreases, the piston 42 is moved upwardly by spring 46 to permit pump 3 to be pivoted upwardly to increase the capacity thereof. Thus the position of stop 47 is automatically adjusted as a function of the speed of operation of the internal combustion engine or of the loading (speed of rotation) of the ship's propeller, to automatically vary the capacity of the pump 3 and thus utilize the full capacity of the internal combustion engine.

While in accordance with the provisions of the Patent Statutes we have illustrated and described the best forms and embodiments of the invention now known to us, it will be apparent to those skilled in the art that other changes and modifications may be made in the apparatus described, without deviating from the invention as set forth in the following claims.

We claim:
1. A hydrostatic energy converter transmission mechanism comprising, in combination,
   a variable capacity swivelable axial piston pump having a pump body and a driving shaft;
   a reversible, hydrostatic capacity-control switching means for said pump;
   an axial piston motor, loaded by said piston pump, said pump having a control element and said motor having a driven shaft;
   an oil reservoir-casing;
   said pump, at least a major part of said motor and said capacity-control means being compactly mounted within said reservoir which is a common housing therefor;
   bearing block means, on a first wall of and within said reservoir, for supporting the driving shaft of said pump, the said pump body of said pump and said hydrostatic capacity-control means;
   the bearing block means, on said first wall, also supporting the control element of said axial piston pump; and
   mounting means, on that wall of said reservoir-casing which is opposite said first wall, for supporting the driven shaft of said axial piston motor.

2. Hydrosatic mechanism according to claim 1, in which said opposite wall of the reservoir-casing, on which is mounted the driven shaft of the axial piston motor, includes a removable cover for the reservoir-casing, the removal of which gives ready access to the contents of said reserovir-casing.

3. Hydrostatic mechanism according to claim 1, in which a pressure line connects said axial piston pump with said motor, and in which a movable limiting stop is provided within the reservoir-casing which limits the maximum rotational deviation of the pump body of said axial piston pump about its swivel axis, said limiting stop being connected with a piston which is movable against the force of a bias spring within a cylinder, said cylinder being loaded by the pressure which is present in said pressure line.

4. Hydrostatic mechanism according to claim 1, in which the swivel axis of said axial piston pump is located at a right angle to the plane of the driving and driven shafts, and in which the driving and driven shafts are parallel to each other, the axis of the driven shaft being at a greater distance from the axis of the driving shaft than is the swivel axis of the control element for the axial piston pump.

References Cited in the file of this patent

UNITED STATES PATENTS

| | | |
|---|---|---|
| 1,993,612 | Lum | Mar. 5, 1935 |
| 2,210,129 | Rose | Aug. 6, 1940 |
| 2,382,437 | Molly | Aug. 14, 1945 |
| 2,569,562 | Froebe | Oct. 2, 1951 |
| 2,662,375 | Postel et al. | Dec. 15, 1953 |
| 2,872,876 | Thoma | Feb. 10, 1959 |
| 2,891,419 | Badalini | June 23, 1959 |
| 2,967,395 | Foerster | Jan. 10, 1961 |

FOREIGN PATENTS

| | | |
|---|---|---|
| 191,194 | Austria | Aug. 10, 1957 |
| 577,334 | Canada | June 9, 1959 |
| 1,009,441 | France | May 29, 1952 |
| 412,816 | Germany | Mar. 23, 1922 |
| 687,364 | Great Britain | May 22, 1950 |

UNITED STATES PATENT OFFICE
CERTIFICATE OF CORRECTION

Patent No. 3,107,491                      October 22, 1963

Otmar Kaup et al.

It is hereby certified that error appears in the above numbered patent requiring correction and that the said Letters Patent should read as corrected below.

Column 4, line 6, strike out "switching"; line 26, for "Hydrosatic" read -- Hydrostatic --; line 48, strike out "swivel axis of the".

Signed and sealed this 19th day of May 1964.

(SEAL)
Attest:

ERNEST W. SWIDER
Attesting Officer

EDWARD J. BRENNER
Commissioner of Patents